United States Patent
Graham et al.

(10) Patent No.: US 10,810,747 B2
(45) Date of Patent: Oct. 20, 2020

(54) DEAD RECKONING POSITIONAL PREDICTION FOR AUGMENTED REALITY AND VIRTUAL REALITY APPLICATIONS

(71) Applicant: Disney Enterprises, Inc., Burbank, CA (US)

(72) Inventors: Todd Michael Graham, Lewis Center, OH (US); Amy E. Nelson, Los Angeles, CA (US)

(73) Assignee: Disney Enterprises, Inc., Burbank, CA (US)

( * ) Notice: Subject to any disclaimer, the term of this patent is extended or adjusted under 35 U.S.C. 154(b) by 117 days.

(21) Appl. No.: 16/123,394

(22) Filed: Sep. 6, 2018

(65) Prior Publication Data

US 2020/0082548 A1 Mar. 12, 2020

(51) Int. Cl.
| | |
|---|---|
| *G06T 7/246* | (2017.01) |
| *G06T 7/73* | (2017.01) |
| *G01C 21/16* | (2006.01) |
| *G06T 19/00* | (2011.01) |
| *G02B 27/01* | (2006.01) |

(52) U.S. Cl.
CPC ............ *G06T 7/248* (2017.01); *G01C 21/165* (2013.01); *G02B 27/0172* (2013.01); *G06T 7/74* (2017.01); *G06T 19/006* (2013.01); *G02B 2027/0138* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,226,669 B1* | 5/2001 | Huang | ................ | G06F 3/011 709/204 |
| 2003/0195735 A1* | 10/2003 | Rosedale | ............. | G06F 30/20 703/13 |
| 2011/0238308 A1* | 9/2011 | Miller | ................ | G01S 19/31 701/472 |
| 2015/0281884 A1* | 10/2015 | Smith | ................ | G01S 5/0263 455/456.3 |
| 2016/0189429 A1* | 6/2016 | Mallinson | ......... | H04N 13/398 345/633 |
| 2016/0270656 A1* | 9/2016 | Samec | ............. | A61B 3/12 |
| 2017/0103541 A1* | 4/2017 | Bellusci | ............. | G06T 7/73 |

(Continued)

OTHER PUBLICATIONS

Wikipedia, "Dead reckoning", retrieved Sep. 6, 2018, 9 pages<https://en.wikipedia.org/wiki/Dead_reckoning#For_networked_games>.

(Continued)

*Primary Examiner* — Omar S Ismail
(74) *Attorney, Agent, or Firm* — Patterson + Sheridan, LLP (57) ABSTRACT

Techniques for predicting a virtual camera view in an augmented reality (AR) or virtual reality (VR) application. A first change in position of a user device over a first time period is determined based on analyzing a plurality of frames of image data related to an AR or VR application. A dead reckoning calculation is used to predict a second change in position of the user device over a second time period, based on the first change in position and data received from an Inertial Measurement Unit (IMU) associated with the user device. A plurality of frames of image data are generated for display in the AR or VR application, based on the predicted second change in position of the user device.

18 Claims, 10 Drawing Sheets

(56) References Cited

U.S. PATENT DOCUMENTS

2017/0357332 A1\* 12/2017 Balan ................. G02B 27/0093
2018/0047332 A1\* 2/2018 Kuwahara ............ G09G 3/2096
2019/0188895 A1\* 6/2019 Miller, IV ............... G06F 3/012

OTHER PUBLICATIONS

IEEE, Draft Standard for Distributed Interactive Simulation—Application Protocols [Annex E only], IEEE P1278.1/D16 Rev 18, May 2012, 18 pages. <http://movesinstitute.org/~mcgredo/MV3500/hla/1278.1-200X%20Draft%2016%20rev%2018.pdf>.

\* cited by examiner

DEAD RECKONING POSITIONAL PREDICTION FOR AUGMENTED REALITY AND VIRTUAL REALITY APPLICATIONS

BACKGROUND

Field of the Invention

This disclosure relates in general to virtual reality (VR) and augmented reality (AR), and more particularly, though not exclusively, to dead reckoning positional prediction in an AR or VR application.

Description of the Related Art

Computer graphics technology has significantly progressed since the first applications were developed. Relatively inexpensive 3D graphics engines now provide nearly photo-realistic interactive applications on hand-held devices and personal computer platforms. These video game systems typically include a hand-held controller, game controller, or, in the case of a hand-held video game platform, an integrated controller. A user interacts with the controller to send commands or other instructions to the video game system to control a video game or other simulation. For example, the controller may include a joystick and buttons operated by the user.

While video games allow the user to interact directly with the video game system, such interactions primarily influence the graphical depiction shown on the video game device (or on a connected display), and rarely influence any other objects outside of the virtual world. That is, a user may specify an input to the video game system, indicating that the user's avatar should perform a jump action, and in response the video game system could display the user's avatar jumping. However, such interactions are typically limited to the virtual world, and any interactions outside the virtual world are limited (e.g., a hand-held gaming device could vibrate when certain actions occur).

Additionally, many hand-held gaming devices include some form of visual sensing device, which may be used to capture an image or a series of images of a physical, real-world scene. The captured images can then be displayed, for instance, on a display of the hand-held gaming device. Certain devices may be configured to insert virtual objects into the captured images before the images are displayed. Some devices may allow users to manipulate the virtual objects being displayed by, for example, moving the device or manipulating a joystick or buttons. This is commonly referred to as an augmented reality (AR) or virtual reality (VR) video game.

SUMMARY

Embodiments described herein include a method of predicting a virtual camera view in an augmented reality (AR) or virtual reality (VR) application. The method includes determining a first change in position of a user device over a first time period based on analyzing a plurality of frames of image data related to an AR or VR application. The method further includes predicting a second change in position of the user device over a second time period, using a dead reckoning calculation and based on the first change in position and data received from an Inertial Measurement Unit (IMU) associated with the user device. The method further includes generating a plurality of frames of image data for display in the AR or VR application, based on the predicted second change in position of the user device.

Embodiments described herein further include a computer program product for predicting a virtual camera view in an AR or VR application. The computer program product includes a computer-readable storage medium having computer-readable program code embodied therewith, the computer-readable program code executable by one or more computer processors to perform an operation. The operation includes determining a first change in position of a user device over a first time period based on analyzing a plurality of frames of image data related to an AR or VR application. The operation further includes predicting a second change in position of the user device over a second time period, using a dead reckoning calculation and based on the first change in position and data received from an Inertial Measurement Unit (IMU) associated with the user device. The operation further includes generating a plurality of frames of image data for display in the AR or VR application, based on the predicted second change in position of the user device.

Embodiments described herein further include a system. The system includes a processor and a memory storing a program, which, when executed on the processor, performs an operation. The operation includes determining a first change in position of a user device over a first time period based on analyzing a plurality of frames of image data related to an AR or VR application. The operation further includes predicting a second change in position of the user device over a second time period, using a dead reckoning calculation and based on the first change in position and data received from an Inertial Measurement Unit (IMU) associated with the user device. The operation further includes generating a plurality of frames of image data for display in the AR or VR application, based on the predicted second change in position of the user device.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

As described above, AR/VR applications can involve the insertion of virtual objects into images of a physical, real world scene. The combination of virtual and real world objects can then be displayed to a user, using a virtual camera view. In an embodiment, an AR/VR application can display the virtual camera view to the user using a head mounted display ("HMD"). This head mounted display can be a slip-in device, such that the user can slip his or her mobile device (e.g., a smartphone) into the head mounted display. Alternatively, the head mounted display can be self-contained, not requiring a separate mobile device.

One challenge in the display of a virtual camera view in an AR/VR application is to align a virtual object in the view with a location or object in the physical world. For example, an AR/VR video game might include a virtual character (e.g., an enemy for the user to defeat) that appears to be located at a specific location in the physical world. In an embodiment, as the user moves in physical space, thereby moving the head mounted display, the virtual character's position in the virtual camera view should change based on the user's physical position and orientation. For example, a user could begin with a head-on view of a virtual character. In an embodiment, if the user moves to her left, the virtual character should appear to rotate in the virtual camera view in a manner corresponding to the movement.

This can be challenging. In particular, this can be challenging if the user moves rapidly during operation of the AR/VR application. In an embodiment, the position of the virtual character in the user's display can be determined based on captured visual images (e.g., using a camera). But these techniques may not be able to keep up with the movement of the user (e.g., the movement of her head), causing the virtual character to appear to jump, or swim, in the user's display.

The use of dead reckoning positional prediction can address this problem. In an embodiment, one or more of the devices used with the AR/VR application can include an Inertial Measurement Unit ("IMU") with one or more sensors. For example, as discussed further below, the user's head mounted display can include an IMU. According to one or more techniques disclosed herein, data from one or more of the IMUs can be used to predict the virtual camera view in future display frames. That is, the data from the IMU can be used to predict how the virtual character (and other items on screen) should be displayed, as the user moves, and before the position can be calculated using other methods (e.g., using camera data). In an embodiment, this reduces (or eliminates) the problem of the virtual character appearing to jump, or swim, in the user's display, by smoothly predicting the virtual camera view as the user moves.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., an AR/VR application 240) or related data available in the cloud. For example, the AR/VR application 240 could execute on a computing system in the cloud and control the use of the application. In such a case, the AR/VR application 240 could control use of the application and store data related to the application at a storage location in the cloud. Doing so allows a user to access this information from any computing system attached to a network connected to the cloud (e.g., the Internet).

Figure 1:
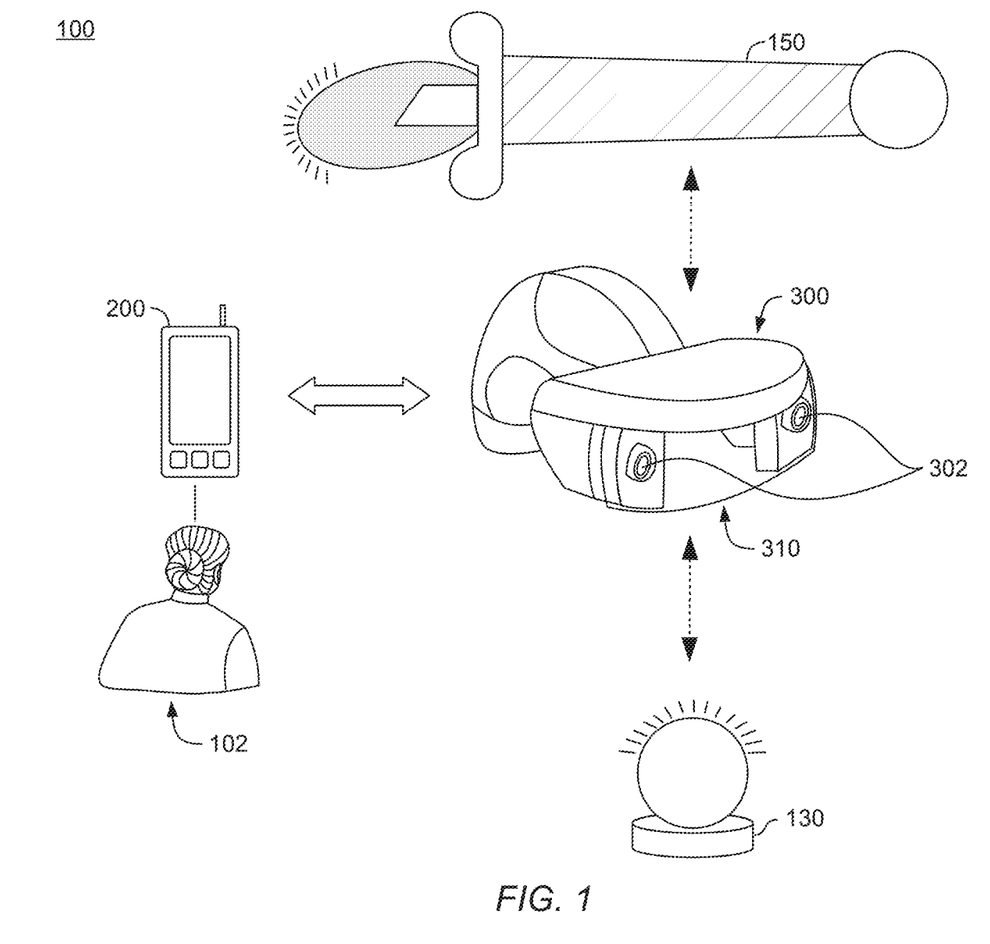
FIG. 1 is an illustration of an exemplary interactive environment, according to one embodiment described herein.

FIG. 1 is an illustration of an exemplary interactive environment, according to one embodiment described herein. In the example embodiment illustrated in FIG. 1, the interactive environment is an AR/VR video game, but embodiments herein can be used with any suitable AR/VR application. Within a system 100, a head mounted display 300 is worn by a user 102 and communicates with a user device 200. This communication can be done wirelessly, through Bluetooth® communications or any other suitable method. Further, the head mounted display 300 can be connected to the user device 200 directly, or through a wired connection. For example, the head mounted display 300 can be connected to the user device 200 through a USB interface. In an embodiment, data can be transmitted between the head mounted display 300 and the user device 200 on a periodic basis (e.g. 60 Hz).

The head mounted display 300 can be a headset to be worn by the user 102, or may be any device including a visual display of any suitable type. For example, the head mounted display 300 may include any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The head mounted display may include a partially, or fully, transparent window through which a user may view the physical world. The head mounted display 300 is discussed further with regard to FIG. 3, below.

In some embodiments, the head mounted display 300 is separate from the user device 200 but is configured to superimpose virtual imagery onto physical objects in the user's field of view. For example, as illustrated in FIG. 1 the head mounted display 300 may be a body-worn device. The head mounted display 300 further includes a holder 310 for a user device 200. For example, the user device 200 can be a portable device like a smartphone or tablet. The user device 200 can be inserted into the holder 310 in the head mounted display 300 during gameplay. The user device 200 is described in more detail with respect to FIG. 2.

The head mounted display 300 may also be configured as an eyepiece or lens worn in front of the user's eye. In another example, the head mounted display 300 may be integrated into other devices that are carried or handled by the user, or having any other suitable user interaction during the game playing experience. For example, while participating in game play, the user may carry a toy blaster that includes an optical sight for aiming, and the head mounted display 300 may be integrated in the optical sight.

In some embodiments, the user device 200 operates in an AR mode, generally configured to superimpose virtual images such as characters, objects, and/or dynamic visual effects into the user's natural field of view of the environment using a head mounted display 300. The field of view of the user is generally determined using sensor devices such as the visual sensors 302. In some embodiments, the user device 200 is configured to operate in a VR mode, generally replacing the user's natural field of view of the environment with virtual imagery using the head mounted display 300.

For example, the head mounted display 300 may superimpose a virtual character to appear seated on a physical chair detected within the environment. The display of the virtual character on the head mounted display 300 is dynamically adjusted based on the user's field of view (orientation), the determined depth of the chair from the user, and so forth. As another example, the head mounted display 300 could superimpose a virtual blade extending from the peripheral device 150 (e.g., a sword hilt) held in the user's hand. In one embodiment, the virtual image can be generated by the user device 200 and displayed as a reflected image on the head mounted display 300. The head mounted display 300 can include optical elements like mirrors, beam splitters, and the like to facilitate display of the reflected image. The head mounted display 300 can also include lenses or other optical elements.

In some embodiments, the user device 200 is configured to dynamically select one of the AR mode and VR mode based on the sensed characteristics of the environment and/or based on the game play. For example, the visual sensors 302 may detect that the environment is extremely bright (e.g., when the user is in direct sunlight), which may be difficult for a user to view overlaid information using the head mounted display 300. In another example, the gameplay may specify a night-time setting. In these examples, the VR mode may be enabled in order to substantially isolate the user's field of view from the surrounding physical environment and thereby reduce the amount of light received from the environment. In both cases, dynamic selection of the AR/VR display mode can improve the immersive nature of the gameplay environment, whether through ensuring the user is able to suitably view the overlaid information or through providing a more realistic setting consistent with the virtual setting of the game.

The head mounted display 300 provides a compact AR/VR display that may be carried or worn by the user during the gameplay experience. As discussed above, the head mounted display 300 may include devices that are separate from the display of the user device 200. Implementations of the compact AR/VR display that use a smartphone or other mobile computing device offer several advantages. For example, implementations able to adapt the user's smartphone provide a reduced manufacturing cost of the compact AR/VR display, as no separate computing hardware need be included. A camera included in the smartphone may be used as visual sensor 302 to dynamically provide information regarding the physical environment and the user's field of view. Using a smartphone may also provide increased convenience to the user, and may provide a relatively large display for viewing.

A number of considerations influence the design of a compact AR/VR display that uses a mobile computing device. Generally, the compact AR/VR display includes an optical arrangement that is configured to transmit some or all of the display of the mobile computing device to the user's eyes. Depending on the currently selected mode (AR or VR), the optical arrangement is further configured to transmit some or all of the light from the physical environment to the user's eyes. It may be beneficial to design a compact AR/VR display to have a relatively small size and weight. Smaller and lighter body-worn implementations allow for use by younger users or other users with reduced size and/or strength, and are generally less fatiguing during use. The positioning of the mobile computing device and/or the optical arrangement can also be selected to reduce a moment on the user. For example, in a head-worn compact AR/VR display, including a smartphone in a position closer to the user's head provides a smaller moment (e.g., corresponding to strain on the neck or upper body) than an implementation in which the smartphone is positioned further from the user's head. A compact (small-sized) implementation also reduces manufacturing costs through reduced material and process requirements. A compact implementation may also be more aesthetically pleasing for users, when compared with a large or bulky implementation.

The system 100 further includes a tracking beacon 130. The tracking beacon 130 includes a light that can be used as a reference point by the user device 200 and/or the head mounted display 300. The visual sensors 302 in the head mounted display 300 can be used to track the light from the tracking beacon 130 in order to provide a reference point for the floor in the user's physical location. Further, the tracking beacon 130 can be in communication with the user device 200 and/or the head mounted display 300 through a suitable wireless or wired communication protocol.

The system 100 further includes the peripheral device 150. In the AR/VR video game illustrated in FIG. 1, the peripheral device 150 acts as a game controller, simulating a sword or staff to the user. The peripheral device 150 can be in communication with a user device 200, a head mounted display 300, and/or a tracking beacon 130. This communication can be done wirelessly through Bluetooth communications, via a wired connection, or through any other suitable method.

Figure 2:
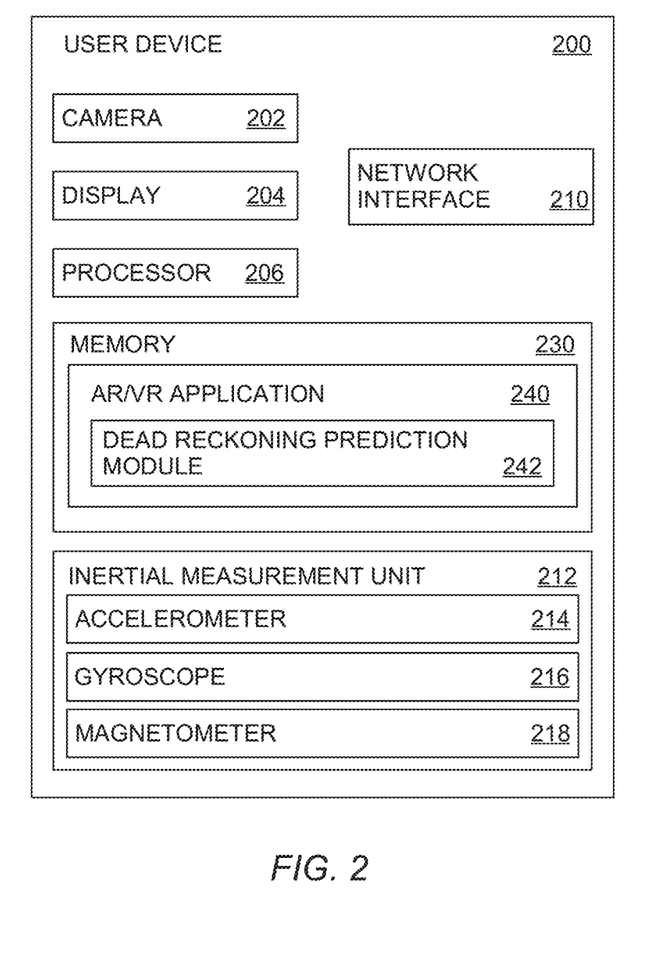
FIG. 2 is a block diagram illustrating a user device, according to one embodiment described herein.

FIG. 2 is a block diagram illustrating a user device, according to one embodiment described herein. The user device 200 can be a smartphone, tablet, or any other suitable device. The user device 200 can be separate from the head mounted display 300, or the user device 200 and the head mounted display 300 can be integrated together to form a combined device. The user device 200 includes a camera 202. The camera 202 can be configured to sense visible light and/or infrared light. Alternatively, the camera 202 can be any other form of suitable visual sensor. The user device 200 further includes a display 204. The display 204 may include any type of dynamic display capable of displaying a visual interface to a user, and may include any type of LED, OLED, CRT, LCD, plasma, electroluminescence, or other display technology.

The user device 200 further includes a network interface 210. In an embodiment, the network interface 210 includes hardware and software sufficient to establish a connection over a communication network. In an embodiment, the network interface 210 can use any suitable communication network, including the Internet, a local access network, or a wide access network. The network interface 210 can be a wired or wireless network. The network interface 210 can use any suitable communication protocol, including any suitable wireless protocol. For example, the network interface 210 can use an IEEE Wi-Fi standard, like an 802.11 standard, another Wi-Fi standard, a cellular protocol (including 3G, LTE, 4G and others), Bluetooth, and others. Further, the network interface 210 can use several different communication protocols.

The user device 200 further includes a processor 206, which generally retrieves and executes programming instructions stored in the memory 230. The processor 206 is included to be representative of a single central processing unit (CPU), multiple CPUs, a single CPU having multiple processing cores, graphics processing units (GPUs) having multiple execution paths, and the like. The memory 230 is generally included to be representative of electronic storage of any suitable type(s), including random access memory or non-volatile storage.

The memory 230 generally includes program code for performing various functions related to game play. The program code is generally described as various functional "applications" or "modules" within the memory 230, although alternate implementations may have different functions and/or combinations of functions. Within the memory 230, the AR/VR application 240 is generally configured to control the AR/VR application for the user. The AR/VR application 240 can, for example, be an AR/VR video game, or any other suitable AR/VR application.

The AR/VR application 240 includes the dead reckoning prediction module 242. In an embodiment, the dead reckoning prediction module 242 is generally configured to perform a dead reckoning prediction using IMU data (e.g., data from IMU 212 or 312). This is discussed in more detail with regard to FIGS. 5-7.

The user device 200 includes an Inertial Measurement Unit (IMU) 212. The IMU 212 includes sensors to measure the position and orientation of the user device 200. For example, the IMU 212 can include an accelerometer 214, which measures acceleration forces stemming from movement of the user device 200 in the user's physical environment. The IMU 212 can further include a gyroscope 216 that measures orientation of the user device 200 in the user's physical environment. The IMU 212 can further include the magnetometer 218, which measures properties of a magnetic field in the user's physical environment. The accelerometer 214, gyroscope 216, and magnetometer 218 are merely examples of sensors that can be included within the IMU 212. In an embodiment, the IMU 212 can include additional suitable sensors, or can include fewer sensors.

Figure 3:
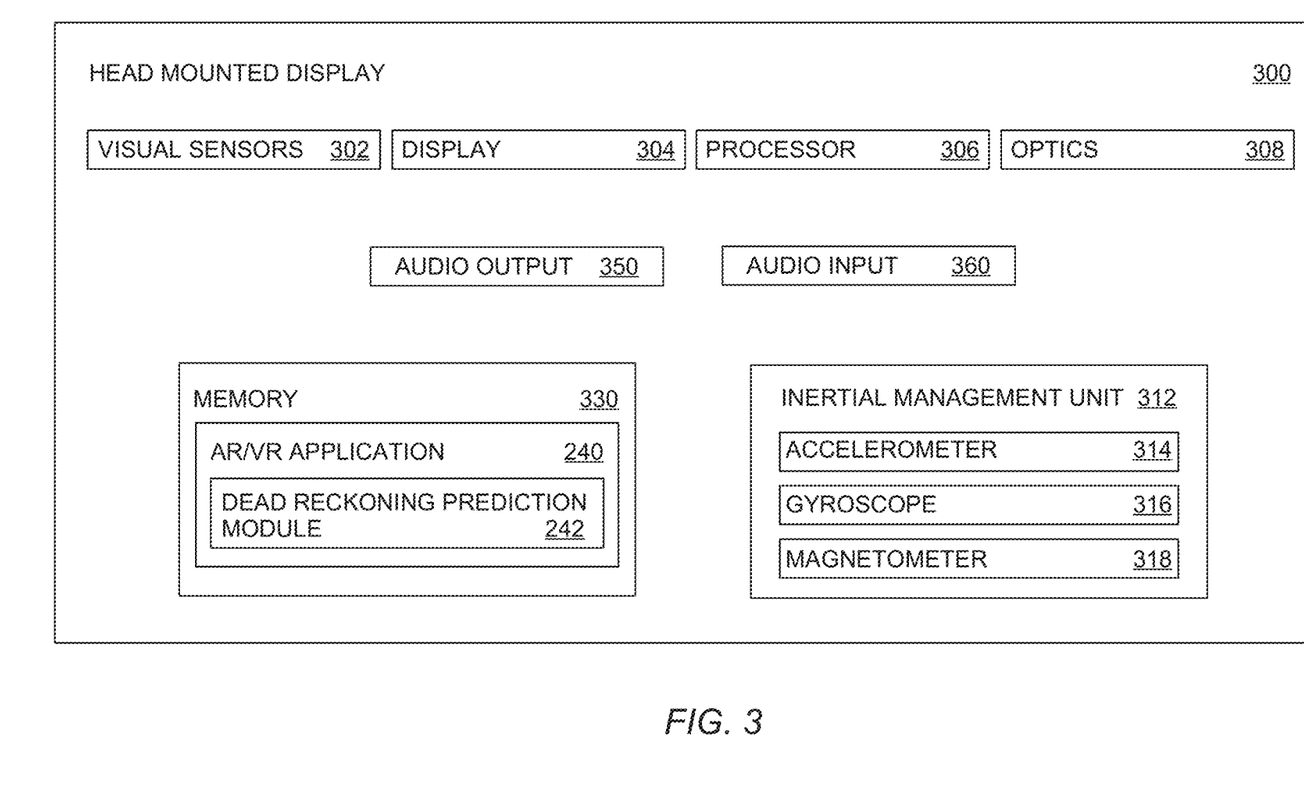
FIG. 3 is a block diagram illustrating a head mounted display, according to one embodiment described herein.

FIG. 3 illustrates an exemplary head mounted display 300, according to one embodiment. The head mounted display 300 can be separate from the user device 200, or the user device 200 and the head mounted display 300 can be integrated together to form a combined device. The head mounted display 300 includes one or more visual sensors 302. The visual sensors 302 can be configured to sense visible light and/or infrared light. Alternatively, the visual sensors 302 can be any other form of suitable visual sensor. The head mounted display 300 further includes a display 304. The display 304 may include any type of dynamic display capable of displaying a visual interface to a user, and may include any type of LED, OLED, CRT, LCD, plasma, electroluminescence, or other display technology.

The head mounted display 300 includes optics 308. The optics 308 can include mirrors, lenses, beam-splitters, and other suitable components. The optics 308 can be used to facilitate display of the virtual and physical environment to the user. The head mounted display 300 includes audio output 350. The audio output 350 can be speakers, headphones, or any other suitable device to output audio. The head mounted display 300 further includes audio input 360. The audio input 360 can be a microphone, or any other suitable audio input device. In an embodiment, the audio output 350 and audio input 360 are components of the user device 200 (e.g., a microphone and speakers in a mobile telephone or table). In another embodiment, the audio output 350 and audio input 360 are separate components in the head mounted display 300.

In an embodiment, the head mounted display 300 can be a lightweight display that does not include its own processor and memory, but instead relies on the user device 200 for operation. For example, the head mounted display 300 can be a slip-in display, in which the processor 206 and the memory 230 of the user device 200 control display and operation of the AR/VR application.

Alternatively, the head mounted display 300 can include its own processor 306, which generally retrieves and executes programming instructions stored in the memory 330. The processor 306 is included to be representative of a single central processing unit (CPU), multiple CPUs, a single CPU having multiple processing cores, graphics processing units (GPUs) having multiple execution paths, and the like. The memory 330 is generally included to be representative of electronic storage of any suitable type(s), including random access memory or non-volatile storage.

The memory 330 generally includes program code for performing various functions related to game play. The program code is generally described as various functional "applications" or "modules" within the memory 330, although alternate implementations may have different functions and/or combinations of functions. Within the memory 330, the AR/VR application 240 is generally configured to control the AR/VR application for the user. The AR/VR application 240 can, for example, be an AR/VR video game, or any other suitable AR/VR application. The AR/VR application 240 in the head mounted display 300 can be generally the same as the AR/VR application 240 in the user device 200. Or the AR/VR application 240 in the head mounted display 300 can be different from the AR/VR application 240 in the user device 200.

The AR/VR application 240 includes the dead reckoning prediction module 242. In an embodiment, the dead reckoning prediction module 242 is generally configured to perform a dead reckoning prediction using IMU data (e.g., data from IMU 212 or 312). This is discussed in more detail with regard to FIGS. 5-7.

The head mounted display 300 includes an IMU 312. As illustrated in FIG. 3, the IMU 312 is separate from the IMU 212 included in the user device 200. Alternatively, the head mounted display 300 can rely on the IMU 212 in the user device 200. The IMU 312 includes sensors to measure the position and orientation of the head mounted display 300. For example, the IMU 312 can include an accelerometer 314 which measures acceleration forces stemming from movement of the head mounted display 300 in the user's physical environment. The IMU 312 can further include a gyroscope 316 that measures orientation of the head mounted display 300 in the user's physical environment. The IMU 312 can further include the magnetometer 318, which measures properties of a magnetic field in the user's physical environment. The accelerometer 314, gyroscope 316, and magnetometer 318 are merely examples of sensors that can be included within the IMU 312. In an embodiment, the IMU can include additional suitable sensors, or can include fewer sensors. For example, the IMU 312 can include only a magnetometer 318, without an accelerometer or gyroscope.

Figure 4A:
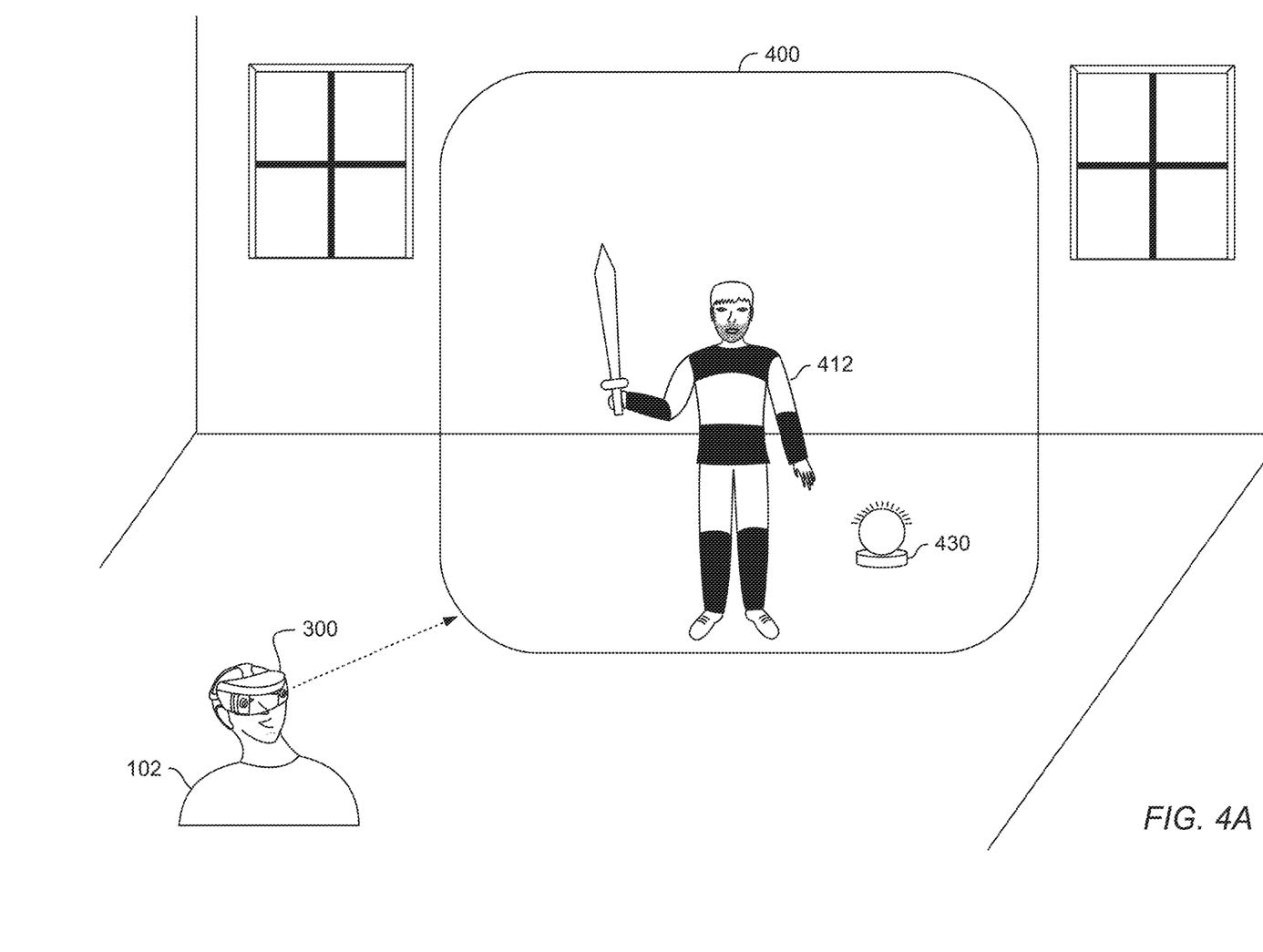
FIGS. 4A-C are illustrations of a view provided in an AR/VR application to a user as the user moves her head, according to one embodiment described herein.
Figure 4B:
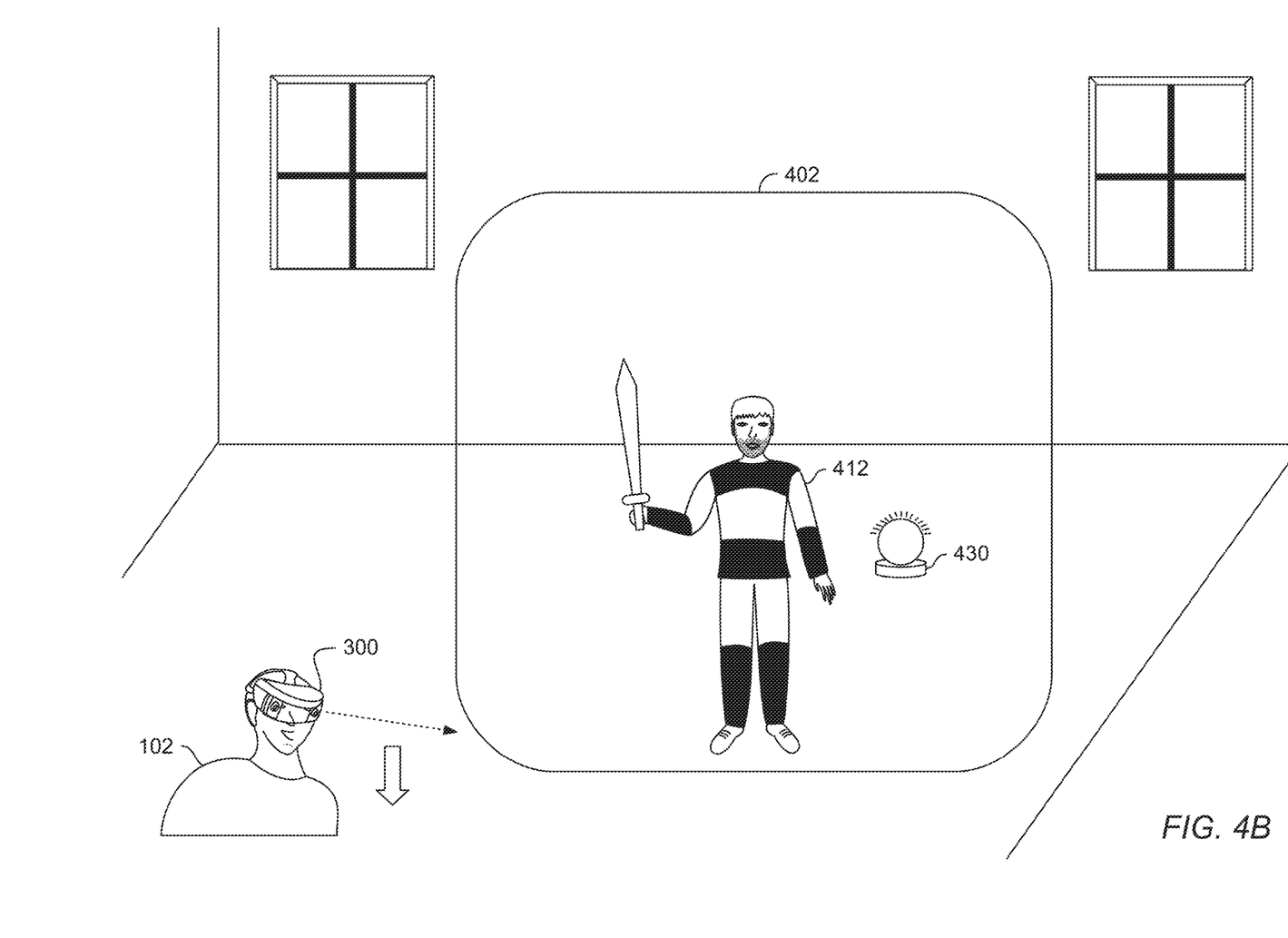
Figure 4C:
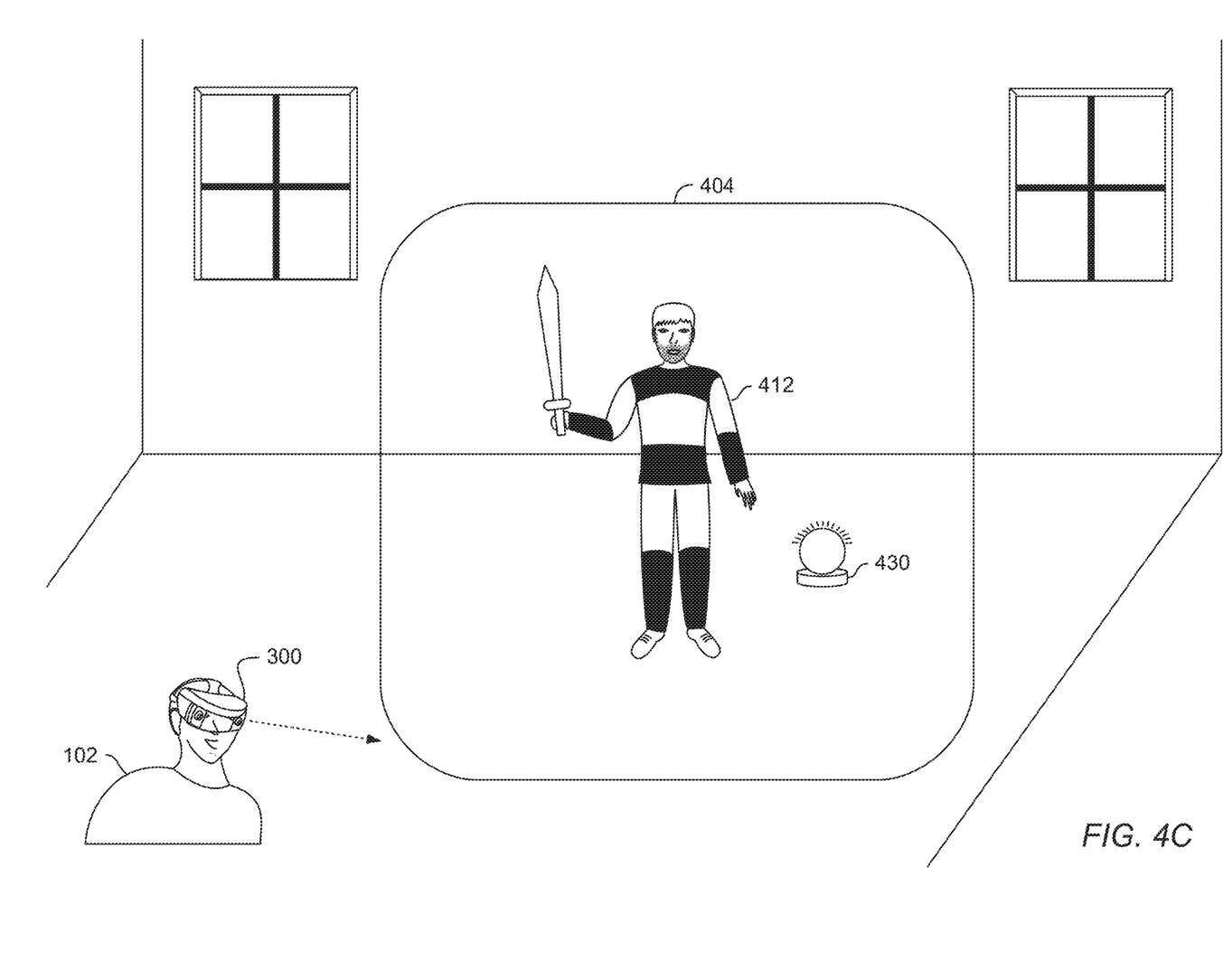

FIGS. 4A-C are illustrations of a view provided in an AR/VR application to a user as the user moves her head, according to one embodiment described herein. FIG. 4A includes a user 102 wearing a head mounted display 300 (e.g., the head mounted display 300 illustrated in FIG. 3). In an embodiment, the head mounted display 300 includes a user device 200 (e.g., a slip in user device). Alternatively, the head mounted display 300 stands alone. An AR/VR application (e.g., the AR/VR application 240) provides the user 102 with a virtual camera view 400 of a virtual character 412 and a tracking beacon 430. In an embodiment, the tracking beacon 430 is the tracking beacon 130 illustrated in FIG. 1, and includes a light that can be used as a reference point by the user device 200 and/or the head mounted display 300.

FIG. 4B illustrates the user 102 moving her head down, causing the head mounted display 300 to tilt downwards. The AR/VR application 240 now provides the virtual camera view 402, which still includes the virtual character 412 and the tracking beacon 430. But while the tracking beacon 430 appears to be in the same physical location in the virtual camera view 402 as the virtual camera view 400, the virtual character 412 has moved—the AR/VR application 240 appears to display the virtual character 412 in the virtual camera view 402 at a different physical location than in the virtual camera view 400. In an embodiment, this is an error. For example, this can result in an error by the AR/VR application 240 in determining the physical position of the virtual character 412 in the virtual camera view 402 (e.g., due to rapid movement by the user 102 of the head mounted display 300).

FIG. 4C illustrates the virtual camera view 404 a short time after the user has moved her head down. The AR/VR application now displays the virtual character 412 in the virtual camera view 404 at the same physical position as in the virtual camera view 402, illustrated in FIG. 4A. In an embodiment, the AR/VR application 240 has corrected the error shown in FIG. 4B. The AR/VR application 240 displays the virtual character 412 in one physical location in the virtual camera view 400 of FIG. 4A, displays the virtual character appears in a different, physical location in the virtual camera view 402 of FIG. 4B (e.g., because of an error in determining the virtual character's position), and displays the virtual character 412 in the virtual camera view 404 of FIG. 4C back in the original location of the virtual camera view 400 (e.g., after correcting the error). This may be undesirable.

Figure 5:
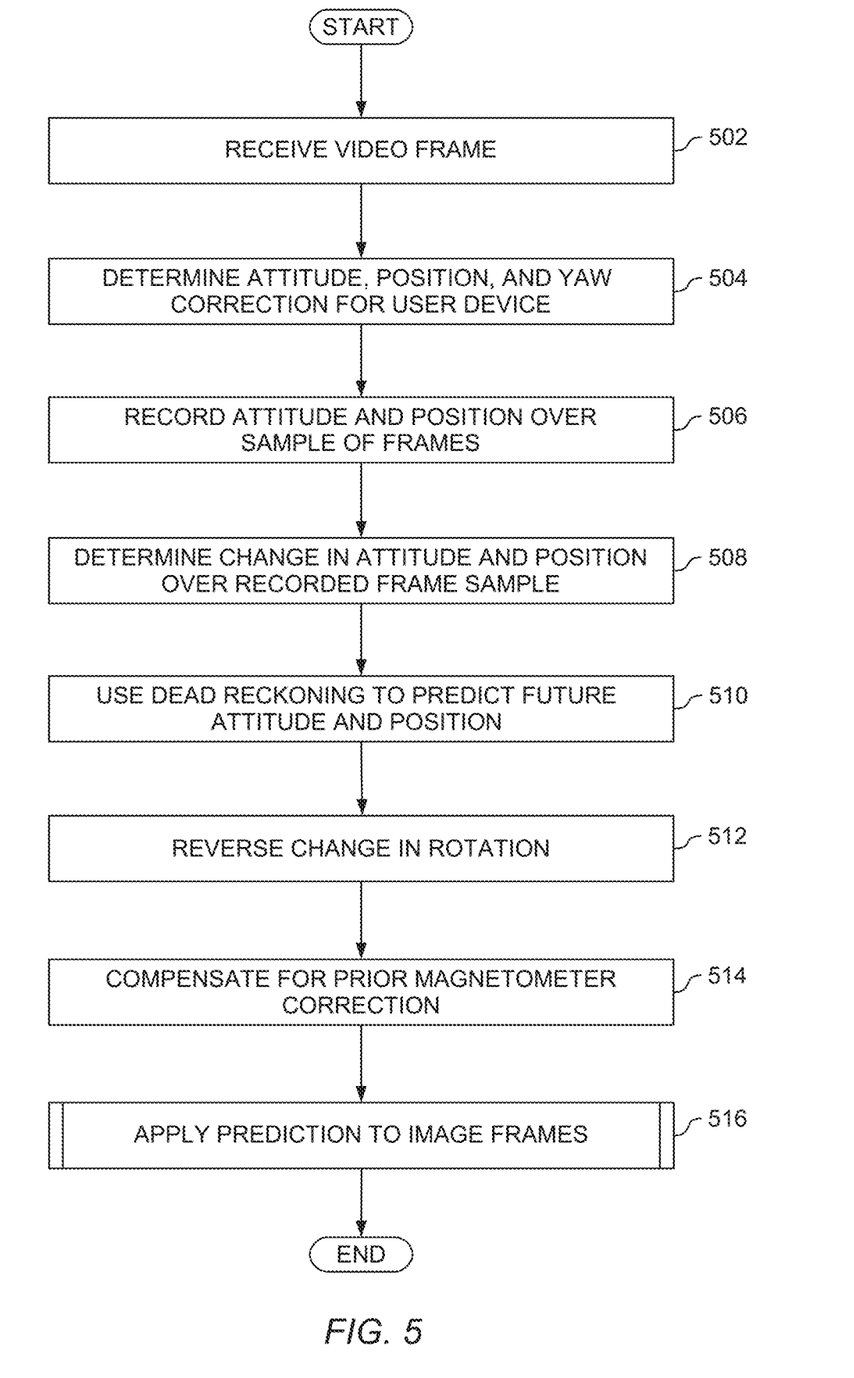
FIG. 5 is a flow chart illustrating dead reckoning positional prediction in an AR/VR application, according to one embodiment described herein.

FIG. 5 is a flow chart illustrating dead reckoning positional prediction in an AR/VR application, according to one embodiment described herein. At block 502, a dead reckoning prediction module (e.g., the dead reckoning prediction module 242) receives the next video frame. In an embodiment, the video frame is captured using the camera 202 in the user device 200. Alternatively, the video frame is captured using the visual sensors 302 in the head mounted display 300, or using both the camera 202 and the visual sensors 302.

At block 504, the dead reckoning prediction module 242 determines the current attitude, position, and yaw correction of the virtual camera displayed by the head mounted display 300. In an embodiment, the dead reckoning prediction module 242 uses data from an IMU (e.g., the IMU 212 in the user device 200 or the IMU 312 in the head mounted display) to determine the current attitude of the head mounted display 300. For example, the current attitude can be expresses as a quaternion value.

In an embodiment, the dead reckoning prediction module 242 uses image recognition to determine the current position of the virtual camera view, relative to a reference object (e.g., relative to the light beacon 130). For example, the dead reckoning prediction module can analyze the captured frame and use image recognition techniques to determine the location of the light beacon 130 in the frame. In an embodiment, the position is expressed as a vector-3 value (e.g., an (x, y, z) value). In an embodiment, the yaw correction is determined using a magnetometer (e.g., the magnetometer 218 or 318).

At block 506, the dead reckoning prediction module 242 records the attitude and position values over a sample of frames. In an embodiment, the number of frames recorded depends on the display frame rate. For example, 1 second of data may be desired. If the frame rate is 60 fps, then 60 frames are recorded. If the frame rate is 10 fps, then only 10 frames are recorded.

At block 508, the dead reckoning prediction module 242 determines the change in attitude and position of the virtual camera displayed using the head mounted display 300, over the recorded sample of frames. For example, if ten frames of data are recorded, at block 508 the dead reckoning prediction module determines the change in attitude and position from ten frames prior to the current frame. This is merely an example, and any suitable number of frames can be used.

At block 510, the dead reckoning prediction module 242 uses dead reckoning prediction to analyze the past change in attitude and position and predict the attitude and position of the virtual camera in the future. In an embodiment, dead reckoning calculations can be used to predict current, and future, positions of an item based upon information about the item's previously determined position and movement. Any suitable dead reckoning algorithm can be used. In an embodiment, the dead reckoning prediction module 242 uses data from an IMU (e.g., the IMU 212 or 312) to perform the dead reckoning prediction. In an embodiment, the dead reckoning prediction module 242 uses quaternion calculations, and the vector-3 position coordinates (e.g., (x, y, z) coordinates), to perform the prediction. In an embodiment, the light beacon 130 is stationary, and the dead reckoning prediction module 242 uses the position of the light to predict the future position and attitude.

At block 512, the dead reckoning prediction module 242 reverses the orientation of the predicted rotation from block 510. For example, at block 510 the dead reckoning prediction module 242 predicts how the head mounted display will move and rotate in the future. But the light beacon 130 will move the opposite direction in the virtual camera view—if the user moves her head to the left, the light beacon 130 will appear to move to the right. At block 512, the dead reckoning prediction module 242 compensates for this.

At block 514, the dead reckoning prediction module 242 compensates for any prior magnetometer correction in the IMU data. In an embodiment, the IMU data used by the dead reckoning prediction module 242 for the dead reckoning prediction may already include some magnetometer correction. To avoid double correction, the dead reckoning prediction module 242 removes this prior magnetometer correction.

At block 516, the dead reckoning prediction module 242 applies the prediction across the required number of frames. In an embodiment, the dead reckoning prediction module 242 predicts for a required length of time (e.g., the length of time required to perform the updated position determination using image recognition techniques on the light beacon 130). The number of frames that must be predicted, therefore, depends on the frame rate. This is discussed in more detail with regard to FIG. 6.

Figure 6:
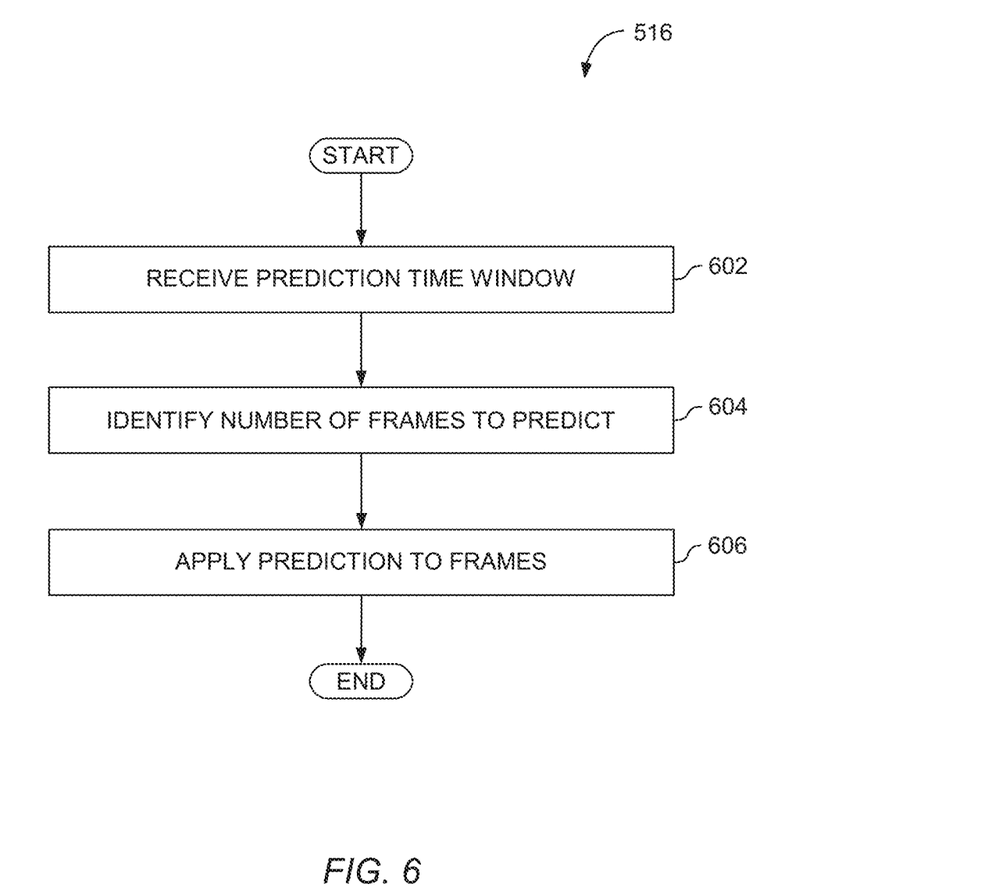
FIG. 6 is a flow chart illustrating applying dead reckoning positional prediction to image frames, in an AR/VR application, according to one embodiment described herein.

FIG. 6 is a flow chart illustrating applying dead reckoning positional prediction to image frames, in an AR/VR application, according to one embodiment described herein. At block 602, the dead reckoning prediction module (e.g., the dead reckoning prediction module 242) receives a prediction time window. In an embodiment, the length of dead reckoning prediction is based on time. For example, a particular delay (e.g., in milliseconds) may be associated with determining position information by analyzing a captured image. In an embodiment, this time window is pre-determined based on a known delay. Alternatively, the time window can be configurable by a user. As another alternative, the dead reckoning prediction module 242 can dynamically determine the time window by, for example, performing test calculations or processing and measuring the duration.

At block 604, the dead reckoning prediction module 242 determines the number of frames to predict based on the time window received at block 602. In an embodiment, the number of frames to predict depends on the display frame rate. For example, a display (e.g., the display 204 in the user device 200 or the display 304 in the head mounted display 300) may display images at 60 frames per second. In this example, if the prediction time window is 500 milliseconds, 30 frames should be predicted. Alternatively, if the display operates at 30 frames per second, a 500 millisecond time window means that 15 frames should be predicted. At block 606, the dead reckoning prediction module 242 applies the dead reckoning prediction (e.g., as discussed in relation to block 510 above) to the determined number of frames.

Figure 7A:
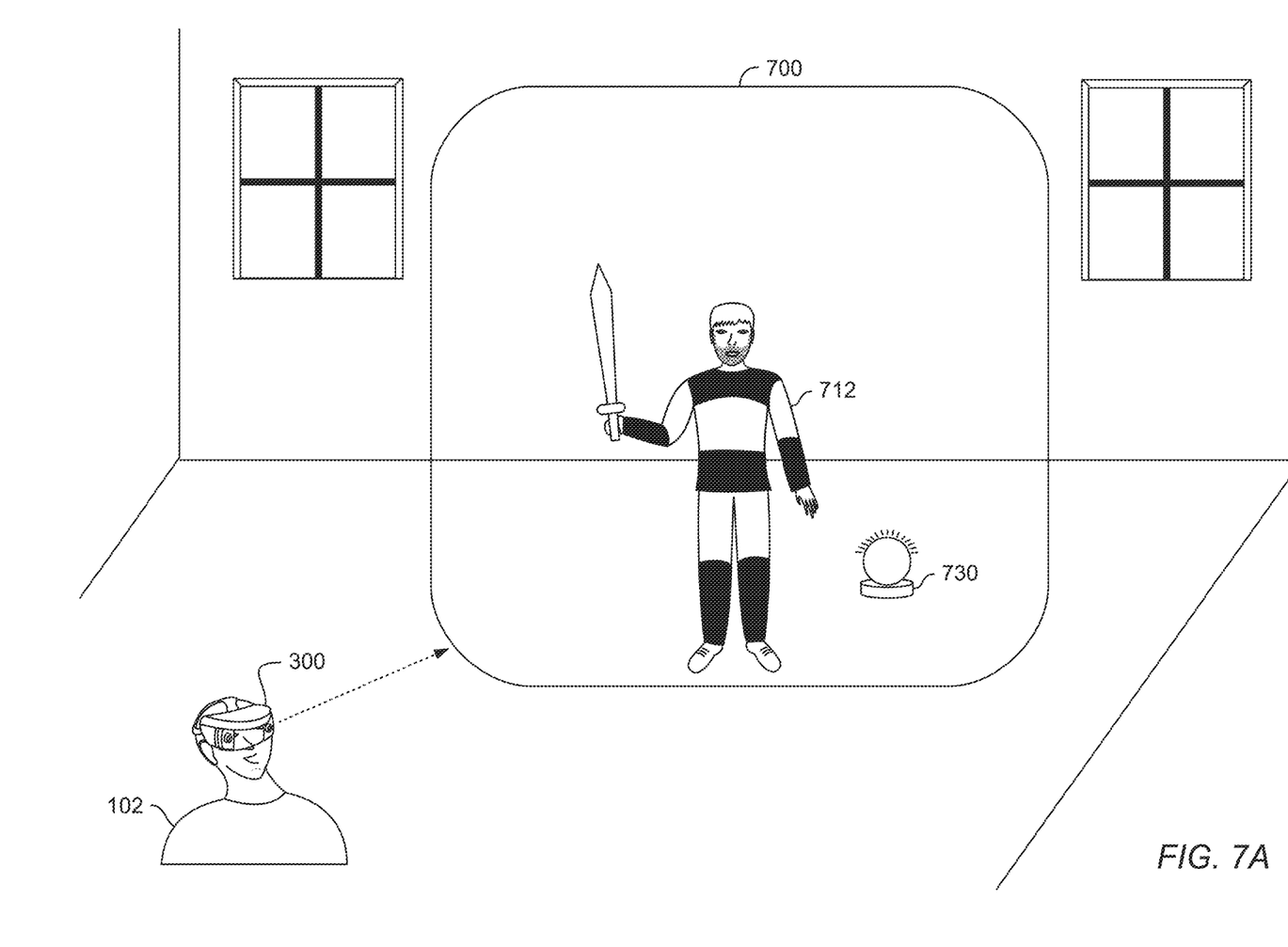
FIGS. 7A-B are further illustrations of a view provided in an AR/VR application to a user as the user moves her head, according to one embodiment described herein.
Figure 7B:
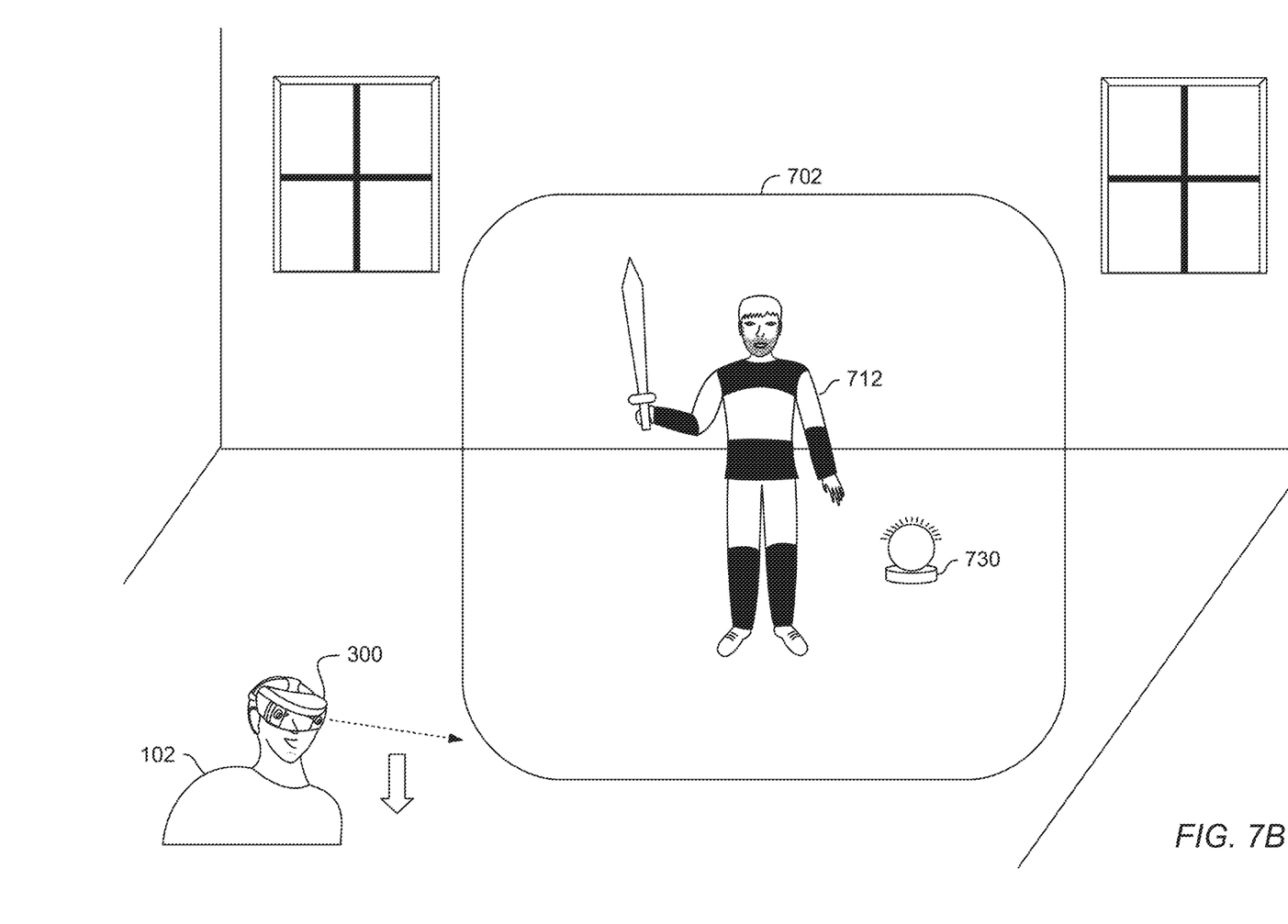

FIGS. 7A-B are further illustrations of a view provided in an AR/VR application to a user as the user moves her head, according to one embodiment described herein. These figures, in contrast to FIGS. 4A-C above, illustrate an embodiment in which the dead reckoning prediction module (e.g., the dead reckoning prediction module 242) is used for dead reckoning positional prediction.

FIG. 7A includes a user 102 wearing a head mounted display 300 (e.g., the head mounted display 300 illustrated in FIG. 3). In an embodiment, the head mounted display 300 includes a user device 200 (e.g., a slip in user device). Alternatively, the head mounted display 300 stands alone. An AR/VR application (e.g., the AR/VR application 240) provides the user 102 with a virtual camera view 700 of a virtual character 712 and a tracking beacon 730. In an embodiment, the tracking beacon 730 is the tracking beacon 130 illustrated in FIG. 1, and includes a light that can be used as a reference point by the user device 200 and/or the head mounted display 300.

FIG. 7B illustrates the user 102 moving her head down, causing the head mounted display 300 to tilt downwards.

The AR/VR application 240 now provides the virtual camera view 702, which still includes the virtual character 712 and the tracking beacon 730. In this illustration, however, the dead reckoning prediction module 242 has been used to predict the user's movement. Thus, in FIG. 7B (in contrast to FIG. 4B), the virtual character 712 appears in the same physical location as in FIG. 7A.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method of predicting a virtual camera view in an augmented reality (AR) or virtual reality (VR) application, comprising:
   determining a first change in position of a user device over a first time period based on analyzing a plurality of frames of image data related to an AR or VR application, comprising:
      identifying a first position of the user device at a first point in time based on analyzing a first image captured using the user device;
      identifying a second position of the user device at a second point in time based on analyzing a second image captured using the user device, wherein the second point in time occurs after the first point in time; and
      identifying the first change in position based on the identified first position of the user device and the identified second position of the user device;
   predicting a second change in position of the user device over a second time period, using a dead reckoning calculation and based on the first change in position and data received from an Inertial Measurement Unit (IMU) associated with the user device; and
   generating a plurality of frames of image data for display in the AR or VR application, based on the predicted second change in position of the user device.

2. The method of claim 1, wherein generating the plurality of frames of image data for display in the AR or VR application further comprises:
   determining a virtual camera view associated with the AR or VR application, wherein the virtual camera view includes a virtual object and a physical object, wherein a relationship between the virtual object and the physical object in the virtual camera view is based on the predicted second change in position of the user device, and wherein at least one of the plurality of frames of image data is based on the determined virtual camera view.

3. The method of claim 1, wherein identifying the first position of the user device comprises identifying a first location of a reference object in the first image and wherein identifying the second position of the user device comprises identifying a second location of the reference object in the second image.

4. The method of claim 1, further comprising:
   determining a first change in attitude of the user device over the first time period based on analyzing data received from the IMU associated with the user device, wherein the data relates to the first time period, and wherein predicting the second change in position of the user device is further based on the determined first change in attitude of the user device.

5. The method of claim 1, wherein generating the plurality of frames of image data for display in the AR or VR application further comprises:
   identifying a display frame rate associated with the AR or VR application;
   determining a first number of frames for generation, based on the identified display frame rate and the second time period; and
   generating the first number of frames of image data.

6. The method of claim 1, further comprising:
   determining a yaw correction value associated with the user device during the first time period based on analyzing data from a magnetometer associated with the user device, wherein the data relates to the first time period, and wherein predicting the second change in position of the user device is further based on the determined yaw correction value.

7. The method of claim 1, wherein the user device comprises a head mounted display.

8. The method of claim 1, wherein the application is an AR application.

9. A computer program product for predicting a virtual camera view in an AR or VR application, the computer program product comprising:
   a computer-readable storage medium having computer-readable program code embodied therewith, the computer-readable program code executable by one or more computer processors to perform an operation, the operation comprising:
      determining a first change in position of a user device over a first time period based on analyzing a plurality of frames of image data related to an AR or VR application, comprising:
         identifying a first position of the user device at a first point in time based on analyzing a first image captured using the user device;
         identifying a second position of the user device at a second point in time based on analyzing a second image captured using the user device, wherein the second point in time occurs after the first point in time; and
         identifying the first change in position based on the identified first position of the user device and the identified second position of the user device;
      predicting a second change in position of the user device over a second time period, using a dead reckoning calculation and based on the first change in position and data received from an Inertial Measurement Unit (IMU) associated with the user device; and generating a plurality of frames of image data for display in the AR or VR application, based on the predicted second change in position of the user device.

10. The computer program product of claim 9, wherein generating the plurality of frames of image data for display in the AR or VR application further comprises:

determining a virtual camera view associated with the AR or VR application, wherein the virtual camera view includes a virtual object and a physical object, wherein a relationship between the virtual object and the physical object in the virtual camera view is based on the predicted second change in position of the user device, and wherein at least one of the plurality of frames of image data is based on the determined virtual camera view.

11. The computer program product of claim 9, wherein identifying the first position of the user device comprises identifying a first location of a reference object in the first image and wherein identifying the second position of the user device comprises identifying a second location of the reference object in the second image.

12. The computer program product of claim 9, the operation further comprising:

determining a first change in attitude of the user device over the first time period based on analyzing data received from the IMU associated with the user device, wherein the data relates to the first time period, and wherein predicting the second change in position of the user device is further based on the determined first change in attitude of the user device.

13. The computer program product of claim 9, wherein generating the plurality of frames of image data for display in the AR or VR application further comprises:

identifying a display frame rate associated with the AR or VR application;

determining a first number of frames for generation, based on the identified display frame rate and the second time period; and generating the first number of frames of image data.

14. A system, comprising:

a processor; and a memory storing a program, which, when executed on the processor, performs an operation, the operation comprising:

determining a first change in position of a user device over a first time period based on analyzing a plurality of frames of image data related to an AR or VR application, comprising:

identifying a first position of the user device at a first point in time based on analyzing a first image captured using the user device;

identifying a second position of the user device at a second point in time based on analyzing a second image captured using the user device, wherein the second point in time occurs after the first point in time; and identifying the first change in position based on the identified first position of the user device and the identified second position of the user device;

predicting a second change in position of the user device over a second time period, using a dead reckoning calculation and based on the first change in position and data received from an Inertial Measurement Unit (IMU) associated with the user device; and generating a plurality of frames of image data for display in the AR or VR application, based on the predicted second change in position of the user device.

15. The system of claim 14, wherein generating the plurality of frames of image data for display in the AR or VR application further comprises:

determining a virtual camera view associated with the AR or VR application, wherein the virtual camera view includes a virtual object and a physical object, wherein a relationship between the virtual object and the physical object in the virtual camera view is based on the predicted second change in position of the user device, and wherein at least one of the plurality of frames of image data is based on the determined virtual camera view.

16. The system of claim 14, wherein identifying the first position of the user device comprises identifying a first location of a reference object in the first image and wherein identifying the second position of the user device comprises identifying a second location of the reference object in the second image.

17. The system of claim 14, the operation further comprising:

determining a first change in attitude of the user device over the first time period based on analyzing data received from the IMU associated with the user device, wherein the data relates to the first time period, and wherein predicting the second change in position of the user device is further based on the determined first change in attitude of the user device.

18. The method of claim 1, wherein the first point in time and the second point in time each occur in the first time period.

\* \* \* \* \*